ent Office

3,047,546
Patented July 31, 1962

3,047,546
VULCANIZATION ACCELERATORS
Friedrich Lober, Leverkusen-Bayerwerk, Helmüt Frëytag, Koln-Stammheim, and Hans Pohle, Leverkusen, Germany, assignors to Farbenfabriken Bayer Aktiengesellschaft, Leverkusen, Germany, a corporation of Germany
No Drawing. Filed Jan. 13, 1958, Ser. No. 708,399
Claims priority, application Germany Jan. 2, 1957
16 Claims. (Cl. 260—79.5)

This invention relates to an improved vulcanization process; more particularly it is concerned with novel vulcanization accelerators.

It is an object of this invention to provide an improved class of vulcanization accelerators. Another object is to provide vulcanization accelerators which exert a powerful accelerating action at curing temperatures. Other objects will be apparent from the description.

It has been found that sulfenamides which are derived from pentahalogen thiophenol can be used as vulcanization accelerators for natural rubber and/or synthetic rubber-like polymers.

The two free valences of the nitrogen atom of the sulfenamides can be saturated by hydrogen, saturated or unsaturated hydrocarbon radicals or by cycloalkyl, aryl or aralkyl radicals. It is possible for these radicals to be the same or different. Moreover, the nitrogen can be a member of a heterocyclic ring system which can contain besides the amido nitrogen other hetero atoms, such as oxygen or sulfur.

The following compounds are examples of compounds suitable for the process according to the invention, these being sulfenamides of pentachlorothiophenol. In the Table A it is only the amine radical which is indicated.

TABLE A

| No. | $-N\begin{matrix}R_1\\R_2\end{matrix}$ | M.P. °C. | Summation formula | Analysis Calc., percent | Analysis Found, percent |
|---|---|---|---|---|---|
| 1 |  | 147–149 | $C_6H_2NSCl_5$ | N: 4.71<br>S: 10.78 | 4.60<br>10.30 |
| 2 | 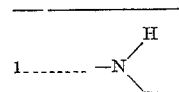 | 67–69 | $C_8H_6NSCl_5$ | | |
| 3 | $-N-i-C_3H_7$<br>  \|<br>  H | 95–97 | $C_9H_8NSCl_5$ | N: 4.12<br>S: 9.66<br>Cl: 52.22 | 3.94<br>9.95<br>52.65 |
| 4 | 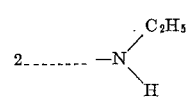 | 70–72 | $C_9H_6NSCl_5$ | N: 4.17<br>S: 9.55<br>Cl: 52.72 | 3.98<br>9.80<br>52.70 |
| 5 | $-N-t-butyl$<br>  \|<br>  H | 106–108 | $C_{10}H_{10}NSCl_5$ | N: 3.96<br>S: 9.07<br>Cl: 50.14 | 4.02<br>9.02<br>49.95 |
| 6 | 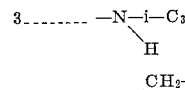 | 91.5–93 | $C_{12}H_{12}NSCl_5$ | N: 3.77<br>S: 8.34<br>Cl: 46.67 | 3.48<br>8.42<br>46.25 |
| 7 | 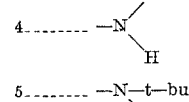 | 108.5–109.5 | $C_8H_6NSCl_5$ | N: 4.30<br>S: 9.85<br>Cl: 54.53 | 4.15<br>10.15<br>54.50 |
| 8 | 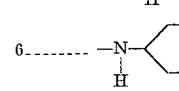 | Liquid | $C_{10}H_{10}NSCl_5$ | N: 3.96<br>S: 9.05<br>Cl: 50.30 | 3.98<br>9.65<br>50.45 |
| 9 |  | 61–63 | $C_{12}H_{14}NSCl_5$ | N: 3.67<br>S: 8.40<br>Cl: 46.52 | 3.64<br>8.6<br>46.05 |
| 10 | 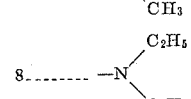 | Liquid | $C_{14}H_{18}NSCl_5$ | S: 7.83<br>Cl: 43.28 | 8.05<br>42.7 |
| 11 | 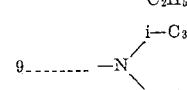 | 72–74 | $C_{14}H_{16}NSCl_5$ | N: 3.43<br>S: 7.86<br>Cl: 43.49 | 3.35<br>7.60<br>43.3 |
| 12 | 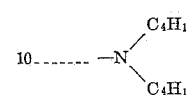 | 190–192 | $C_{18}H_{22}NSCl_5$ | N: 3.03<br>S: 6.94<br>Cl: 38.40 | 2.87<br>7.1<br>38.55 |

TABLE A—Continued

| No. | $-N\begin{matrix}R_1\\R_2\end{matrix}$ | M.P. °C. | Summation formula | Analysis Calc., percent | Analysis Found, percent |
|---|---|---|---|---|---|
| 13 | $-N\begin{matrix}CH_2\\ \\CH_2\end{matrix}$ | 108–110 | $C_8H_4NSCl_5$ | N: 4.33<br>S: 9.90<br>Cl: 54.95 | 4.05<br>10.00<br>55.10 |
| 14 | $-N\begin{matrix}CH_2-CH_2\\ \\CH_2-CH_2\end{matrix}$ | 88–90 | $C_{10}H_{18}NSCl_5$ | N: 3.98<br>S: 9.12<br>Cl: 50.43 | 4.0<br>9.40<br>50.0 |
| 15 | $-N\begin{matrix}CH_3\\ \\C_6H_5\end{matrix}$ | 97–99 | $C_{13}H_8NSCl_5$ | N: 3.61<br>S: 8.25<br>Cl: 45.75 | 2.80<br>7.50<br>45.80 |
| 16 | $-N\begin{matrix}C_2H_5\\ \\C_6H_5\end{matrix}$ | 79–82 | $C_{14}H_{10}NSCl_5$ | N: 3.49<br>S: 7.98<br>Cl: 44.25 | 3.81<br>8.20<br>44.40 |
| 17 | $-N\begin{matrix}CH_2-CH_2\\ \phantom{xx}CH_2\\CH_2-CH_2\end{matrix}$ | 129–130 | $C_{11}H_{10}NSCl_5$ | N: 3.73<br>S: 8.75 | 3.60<br>9.25 |
| 18 | $-N\begin{matrix}CH_2-CH_2-CH_2\\ \\CH_2-CH_2-CH_2\end{matrix}$ | 58–61 | $C_{12}H_{12}NSCl_5$ | | |
| 19 | $-N\begin{matrix}CH_2-CH_2\\ \phantom{xx}O\\CH_2-CH_2\end{matrix}$ | 179–180 | $C_{10}H_8ONSCl_5$ | | |
| 20 | $-N(H)-CH_2-CH(C_2H_5)-(CH_2)_3-CH_3$ | 44–45 | | | |
| 21 | $-N(H)-C(CH_3)_2-CH_2-C(CH_3)_2-CH_3$ | 73–75 | | | |
| 22 | $-N(H)-n\text{-}C_{12}H_{25}$ | 62–64 | | | |
| 23 | $-N\begin{matrix}CH_2-CH_2\\ \phantom{xx}S\\CH_2-CH_2\end{matrix}$ | | | | |
| 24 | $-N(H)-CH_2-C_6H_{11}$ | | | | |
| 25 | $-N-CH_2-C_6H_{11}$, CH(CH_3)_2 | | | | |

The compounds used according to the invention can be prepared by the action of oxidizing agents, such as for example sodium hypochlorite, iodine, hydrogen peroxide, ammonium persulfate and potassium ferricyanide, on a mixture of pentahalogen thiophenol and the corresponding amine in aqueous medium or in solvents miscible with water. The sulfenamides can moreover also be obtained by reacting N-halogen derivatives of the amines, more especially of secondary amines, either with pentahalogen thiophenol in the presence of suitable hydrogen halide acceptors or even with the alkali metal, alkaline earth metal or amine salts of pentahalogen thiophenols in the aqueous phase or in solvents. Furthermore, the new sulfenamides can also be obtained by replacing the $NH_2$ group in pentahalogen phenyl sulfenamide by primary or secondary amines. It is also possible to obtain the sulfenamides used in the new process by reacting the pentahalogen phenyl sulfene chlorides with the corresponding amines in the presence of a suitable hydrogen halide acceptor in an organic solvent or with excess amine. The pentahalogen phenyl sulfene chlorides can be easily obtained by chlorination of pentahalogen thiophenol in organic solvents such as chloroform, carbon tetrachloride, and chlorobenzene at temperatures in the range from about $-10$ to $50°$ C.

The sulfenamides described according to the invention can be used alone or in combination with other known vulcanization accelerators. They can be used in mixtures of natural rubber and/or synthetic rubber-like elastomers, the said mixtures being filled with carbon black or containing light-colored fillers. If they are used alone, the sulfenamides provide vulcanizates with substantially higher modulus values and breaking strengths than those obtained when using thiophenol sulfenamides, the phenyl radicals of which are not or are only partially substituted with halogen or alkyl radicals.

Known accelerators which are particularly suitable for use with the accelerators according to the invention are those from the thiazole series, such as mercapto-benzothiazole or the sulfenamides thereof, and also benzothiazole monosulfide or disulfide, benzothiazyl-2,4-dinitrophenyl thioether, and also accelerators of the dithiocarbamate and thiuram series and accelerators of the aldehyde amine and guanidine series. In many cases, it can be advantageous if several of the sulfenamides described according to the invention are combined with several of the known accelerators. In this way, the plasticity properties of the raw mixtures can be improved prior to vulcanization and the vulcanization range can be extended. In addition, there is obtained increased safety against a premature vulcanization of the raw mixtures.

The pentahalogen phenyl sulfenamides used according to the invention are generally employed in the quantities usual in vulcanization processes. Quantities in the range from 0.05 to 10%, preferably 0.1 to 4.0%, based on the rubber content of the mixtures, are generally sufficient, although other quantities can be chosen for special effects.

The synthetic rubber-like polymers for which the vulcanization accelerators can be used can be obtained for instance from conjugated diolefines such as butadiene, dimethyl-butadiene, isoprene and their homologues or copolymers of conjugated diolefines with polymerizable vinyl compounds such as styrene, α-methyl-styrene and their substitution products, acrylonitrile, methacrylonitrile, acrylates and methacrylates and similar compounds or copolymers which are obtained from iso-olefines such as isobutylene and its homologues with a small amount of conjugated diolefines. Furthermore they are suitable polymerizates obtained from chlorobutadiene and its copolymerizates obtained with mono- and/or di-olefines or other polymerizable vinyl compounds.

The following examples further illustrate the invention without, in any way, limiting it thereto.

*Example 1*

A test mixture is prepared which contains the following, per 100.0 parts by weight of natural rubber:

15.0 parts by weight of active zinc oxide
20.0 parts by weight of zinc white
10.0 parts by weight of titanium dioxide
2.5 parts by weight of sulphur and
0.7 part by weight of stearic acid This test mixture is divided into 11 equal parts. 1% by weight based on the rubber content of the mixture, of the following compounds is mixed with each of the first four parts of the said test mixture.

(A) Phenyl piperidine sulphenamide
(B) 4-chlorophenyl-piperidine sulphenamide
(C) 2,3,5-trichlorophenyl piperidine sulphenamide
(D) Pentachlorophenyl piperidine sulphenamide After vulcanization, the Schopper ring test provides the following values (the first number indicates the modulus value at 500% elongation and the second number the tensile strength (kg./cm.$^2$); the third number when used indicates the elongation (percent)):

|  | A | B | C | D |
|---|---|---|---|---|
| 2 at— | | | | |
| 100′ | 35-165 | 34-165 | 30-145 | 38-190 |
| 160′ | 50-205/785 | 46-190/775 | 43-185/785 | 54-210/760 |
| 180′ | 48-190/740 | 43-175/765 | 41-180/790 | 53-205/755 |

1% by weight, based on the rubber content of the mixture of one of the following compounds is mixed in each case with four additional parts of the same test mixture referred to above:

(E) Phenyl diethyl sulphenamide
(F) 4-chlorophenyl diethyl sulphenamide
(G) 2,3,5-trichlorophenyl diethyl sulphenamide
(H) Pentachlorophenyl diethyl sulphenamide After vulcanization and under the same test conditions, the following comparative values are obtained:

|  | E | F | G | H |
|---|---|---|---|---|
| 2 at— | | | | |
| 100′ | 15-120 | 21-130 | 18-130 | 36-180 |
| 160′ | 37-170/780 | 38-180/805 | 33-165/825 | 49-205/770 |
| 180′ | 37-175/790 | 37-180/805 | 33-160/820 | 49-210/775 |

The other three parts of the above test mixture had admixed therewith 1% by weight, based on the rubber content of the mixture, of the following compounds:

(I) 4-chlorophenyl cyclohexyl ethyl sulphenamide
(K) 2,3,5-trichlorophenyl cyclohexyl ethyl sulphenamide
(L) Pentachlorophenyl cyclohexyl ethyl sulphenamide After vulcanization and under the above test conditions, the following values are obtained:

|  | I | K | L |
|---|---|---|---|
| 2 at— | | | |
| 100′ | 15-100 | 9-70 | 26-150 |
| 160′ | 32-160/810 | 20-150/900 | 43-175/760 |
| 180′ | 35-170/790 | 22-145/885 | 43-175/760 |

The relatively high efficiency of the sulphenamides of pentachlorothiophenol can be seen in each row and is all the more outstanding, since the pentachlorophenyl derivatives are not used in an increased amount in spite of their higher molecular weight.

The pentachlorophenyl piperidine sulphenamide can be prepared in the following manner:

The solution of 60.5 g. of sodium pentachlorothiophenol in 200 cc. of water is added dropwise at 30–35° C. to the solution of 25.2 g. of freshly prepared 95% N-chloropiperidine in 70 cc. of alcohol. After stirring for 2 hours at room temperature, the precipitated substance is filtered with suction and washed until free from common salt by repeated washing with water. After drying, 59 g. of the sulphenamide remain (M.P. 125–128° C., after being allowed to crystallize from cyclohexane M.P. 129–130° C.).

The pentachlorophenyl diethyl sulphenamide can be obtained as follows:

A powerful dry stream of chlorine is introduced while stirring and with exclusion of moisture at 0–5° C. into a suspension of 70 g. of dry pentachlorothiophenol in 500 cc. of carbon tetrachloride until there is a slight excess of chlorine. The solvent and any hydrogen chloride or chlorine which may still be present are removed from the resultant clear solution in vacuo at a bath temperature of 30–50° C. The pentachlorophenyl sulphene chloride precipitates as an orange-yellow substance (M.P. 99–102° C.).

*Analysis.*—Calculated for $C_6Cl_6S$: Cl, 67.14%; S, 10.12%. Found: Cl, 66.45%; S, 9.95%.

The solution of 34 g. of pentachlorophenyl sulphene chloride in 150 cc. of carbon tetrachloride is added dropwise while stirring and with exclusion of moisture at 20–30° C. to the solution of 18 g. of diethyl amine in 100 cc. of carbon tetrachloride and stirring is continued for about 1 hour at room temperature. After filtering with suction, the filtrate is washed with water until free from amine and dried over sodium sulphate. The solvent is distilled off in vacuo. The remaining sulphenamide forms a brown liquid, the yield being 32 g. (89%) of the theoretical.

The pentachlorophenyl cyclohexyl ethyl sulphenamide can be obtained in analogous manner.

*Example 2*

A test mixture is prepared, which contains per 100.0 parts by weight of natural rubber:

27.0 parts by weight of MAF carbon black
10.0 parts by weight of zinc white and
3.0 parts by weight of sulphur This test mixture is divided into two equal parts and 1% by weight, based on the rubber content of the mixture, of the compound (1) is added to one part and the same quantity of the mixture (2) is added to the other part.

(1) 0.75 part by weight of benzothiazyle cyclohexyl sulphenamide
(2) 0.40 part by weight of benzothiazyle cyclohexyl sulphenamide+
0.60 part by weight of pentachlorophenyl cyclohexyl sulphenamide After suitable vulcanization, the Schopper ring test supplies the following comparison values (the first number again represents the modulus value at 300% elongation and the second number indicates the tensile strength elongation):

|  | 1 | 2 |
|---|---|---|
| 1 at— | | |
| 23′ | 13– 65 | 3– 10 |
| 30′ | 42–210/665 | 8– 40 |
| 2.5 at— | | |
| 45′ | 72–265/610 | 72–260/605 |
| 65′ | 70–255/605 | 73–260/600 |
| 120′ | 70–220/590 | 74–235/565 |

By adding the sulphenamide of pentachlorothiophenol, there is clearly obtained a retarded initiation of vulcanization and a higher degree of working reliability in the processing of the mixture. At the same time, from the range of modulus values and strength values, it is seen that the vulcanization range has been extended.

Pentachlorophenyl cyclohexyl sulphenamide can be obtained as follows:

700 g. of dry pentachlorothiophenol are thoroughly stirred with 370 g. of cyclohexyl amine and thereafter 1 litre of water is added. With vigorous stirring and external cooling, 1380 cc. of sodium hypochlorite (content: 138 g. of NaOCl in 1 litre of solution) are added dropwise at an internal temperature of about 5 to 10° C. and over a period of 3 to 4 hours and stirring is thereafter continued for another 3 hours at about 10° C. After filtering with suction, the reaction product is washed with water until free from amine and thereafter dried in vacuo. Yield: 760 g. (80%) of the theoretical. M.P. 87–89°. After being dissolved in and allowed to crystallize from chloroform/methanol, the substance melts at 91.5 to 93° C.

*Example 3*

A test mixture is prepared which contains, per 100.0 parts by weight of butadiene-styrene copolymer:

46.0 parts by weight of HAF carbon black
5.0 parts by weight of zinc oxide
2.0 parts by weight of wool fat
5.0 parts by weight of mineral oil plasticizer
0.75 part by weight of paraffin wax
1.5 parts by weight of stearic acid
1.8 parts by weight of sulphur
0.5 part by weight of phenyl-β-naphthylamine
0.5 part by weight of phenyl cyclohexyl-p-phenylene diamine The test mixture is divided into two equal parts and the following additives, based on the rubber content, are added to each part:

(1) 1.8% of benzothiazole morpholyl sulphenamide
(2) 0.9% benzothiazole morpholyl sulphenamide
1.3% pentachlorophenyl cyclohexyl sulphenamide After suitable vulcanization, the Schopper ring test supplies the following comparison values (the first number indicates the modulus value at 300% elongation, and the second number the tensile strength (kg./cm.²)):

| Vulcanization in the press | 1 | 2 |
|---|---|---|
| 2 at— | | |
| 30′ | 10– 35 | 5– 5 |
| 40′ | 50–145 | 14– 45 |
| 3 at— | | |
| 20′ | 37–130 | 15– 50 |
| 40′ | 99–200 | 80–205 |
| 60′ | 108–200 | 101–200 |
| 85′ | 111–200 | 105–200 |

*Example 4*

As in Example 3, the test mixture referred to with a base of 100 parts by weight of butadiene-styrene copolymer is divided into two equal parts and the following additives, based on copolymer content, are added to these parts:

(1) 1.8% benzothiazyl cyclohexyl sulphenamide
(2) 1.0% of benzothiazyl cyclohexyl sulphenamide
1.4% of pentachlorophenyl cyclohexyl sulphenamide After suitable vulcanization, the Schopper ring test yields the following comparison values (the first number indicates the modulus value at 200% elongation—and the second number the tensile strength (kg./cm.²)).

| Vulcanization in the press | 1 | 2 |
|---|---|---|
| 2 at 40′ | 31–155 | 9– 50 |
| 3 at— | | |
| 20′ | 33–165 | 15–100 |
| 40′ | 50–190 | 46–180 |
| 60′ | 53–190 | 52–190 |
| 85′ | 54–175 | 55–185 |
| 110′ | 53–165 | 56–170 |

*Example 5*

A test mixture is prepared which contains the following, per 100.0 parts by weight of natural rubber:

15.0 parts by weight of active zinc oxide
20.0 parts by weight of zinc white
10.0 parts by weight of titanium dioxide
2.5 parts by weight of sulphur and
0.7 part by weight of stearic acid This test mixture is divided into 17 equal parts. 1% by weight based on the rubber content of the mixture, of the compounds mentioned in Table 1 under the same number as mentioned in the following table is mixed with one of the above mentioned parts of the rubber mixture. After vulcanization, the Schopper ring test provides the following values:

TABLE 6

| Compound No. | Scorching at 135° C. | | | Final heating at 135° C. | | |
|---|---|---|---|---|---|---|
| | Time (min.) | Mod. at 500% (kg./cm.²) | Tensile strength (kg./cm.²) | Time (min.) | Mod. at 500% (kg./cm.²) | Tensile strength (kg./cm.²) elongation (percent) |
| 1 | 30 | 16 | 100 | 100 | 71 | 210/700 |
| | 50 | 50 | 185 | 150 | 72 | 205/690 |
| | | | | 200 | 73 | 190/685 |
| 2 | 30 | 4 | 20 | 100 | 39 | 200/840 |
| | 50 | 16 | 95 | 150 | 48 | 210/810 |
| | | | | 200 | 49 | 210/790 |
| 3 | 30 | 3 | 15 | 100 | 40 | 210/850 |
| | 50 | 12 | 85 | 150 | 51 | 210/800 |
| | | | | 200 | 53 | 190/770 |
| 4 | 30 | 4 | 5 | 100 | 35 | 175 |
| | 50 | 14 | 95 | 150 | 43 | 200/820 |
| | | | | 200 | 44 | 200/795 |
| 5 | 30 | 4 | 20 | 100 | 27 | 165 |
| | 50 | 6 | 40 | 150 | 38 | 210/865 |
| | | | | 200 | 43 | 195/815 |
| 6 | 30 | 4 | 20 | 100 | 43 | 205/850 |
| | 50 | 8 | 75 | 150 | 52 | 225/800 |

TABLE 6—Continued

| Compound No. | Scorching at 135° C. | | | Final heating at 135° C. | | |
|---|---|---|---|---|---|---|
| | Time (min.) | Mod. at 500% (kg./cm.²) | Tensile strength (kg./cm.²) | Time (min.) | Mod. at 500% (kg./cm.²) | Tensile strength (kg./cm.²) elongation (percent) |
| 16 | 30 | | | 200 | 52 | 200/770 |
| | 50 | 5 | 15 | 100 | 12 | 85 |
| | | | | 150 | 20 | 150 |
| | | | | 200 | 28 | 170/880 |
| 7 | 30 | 3 | 10 | 100 | 45 | 200/830 |
| | 50 | 17 | 120 | 150 | 51 | 210/795 |
| | | | | 200 | 54 | 200/775 |
| 8 | 30 | 3 | 10 | | | |
| | 50 | 17 | 120 | 150 | 50 | 205/790 |
| | | | | 200 | 49 | 210/770 |
| 10 | 30 | 4 | 25 | 100 | 36 | 175 |
| | 50 | 6 | 40 | 150 | 48 | 215/820 |
| | | | | 200 | 49 | 210/805 |
| 12 | 30 | 5 | 15 | 100 | 13 | 85 |
| | 50 | 6 | 40 | 150 | 18 | 125 |
| | | | | 200 | 23 | 150/900 |
| 13 | 30 | 15 | 100 | 100 | 48 | 200/800 |
| | 50 | 30 | 160 | 150 | 52 | 210/790 |
| | | | | 200 | 53 | 195/765 |
| 14 | 30 | 3 | 15 | 100 | 27 | 175 |
| | 50 | 11 | 90 | 150 | 35 | 190 |
| | | | | 200 | 40 | 205/815 |
| 17 | 30 | 9 | 55 | | | |
| | 50 | 28 | 150 | 150 | 56 | 215/760 |
| | | | | 200 | 53 | 210/750 |
| 18 | 30 | 7 | 45 | 100 | 53 | 215/795 |
| | 50 | 27 | 150 | 150 | 59 | 225/770 |
| | | | | 200 | 61 | 205/755 |
| 19 | 30 | 3 | 10 | 100 | 29 | 185 |
| | 50 | 8 | 55 | 150 | 38 | 205/850 |
| | | | | 200 | 43 | 200/810 |

The compound which is mentioned in the above table under number 19 can be prepared as follows:

6 g. of pentachlorophenyl sulphenamide of the formula $C_6Cl_5S-NH_2$ are thoroughly stirred with 7 g. of morpholine and heated for 10 minutes at 40–50° C. After standing overnight, it is washed with water until free from amine and, after drying, there are obtained 7.2 g. (98% of the theoretical) of morpholyl sulphenamide (M.P. 174–176° C., after being recrystallized from chloroform/methanol M.P. 179–180° C.).

The other compounds can be prepared by analogous processes.

Example 6

A test mixture is prepared which contains the following, per 100.0 parts by weight of natural rubber:

42.0 parts by weight of SAF carbon black
3.0 parts by weight of zinc oxide
4.0 parts by weight of mineral oil plasticizer
2.5 parts by weight of stearic acid
0.75 part by weight of paraffin wax
2.5 parts by weight of sulphur
0.5 part by weight of phenyl cyclohexyl-p-phenylene diamine
0.5 part by weight of phenyl-β-naphthylamine This test mixture is divided into 4 equal parts. To each part one of the following compounds respectively mixtures of compounds in the amounts mentioned based on the rubber content of the mixture are added.

(1) 0.4% benzothiazyle-2-cyclohexyl sulphenamide
(2) 0.4% benzothiazyle-2-cyclohexyl sulphenamide
  1.2% pentachlorophenyl sulphenamide
(3) 0.4% benzothiazyle-2-cyclohexyl-sulphenamide
  1.2% pentachlorophenyl cyclohexyl sulphenamide
(4) 0.4% benzothiazyle-2-cyclohexyl sulphenamide
  1.2% pentachlorophenyl piperidine sulphenamide After vulcanization, the Schopper ring test provides the following values (the first number indicates the modulus value at 300% elongation and the second number the tensile strength (kg./cm.²) elongation (percent)):

| | 1 | 2 | 3 | 4 |
|---|---|---|---|---|
| 1.0 at— | | | | |
| 23' | 18–140 | 6–50 | 8–75 | 9–100 |
| 30' | 32–185 | 13–115 | 22–165 | 39–220 |
| 2.5 at— | | | | |
| 40' | 92–290/615 | 101–300/635 | 105–300/605 | 123–300/600 |
| 60' | 95–285/605 | 110–285/600 | 120–300/580 | 129–305/560 |
| 90' | 95–275/600 | 104–295/560 | 123–295/560 | 132–305/540 |

Example 7

A test mixture is prepared which contains the following, per 100.0 parts by weight of butadiene styrene copolymerizate:

44.00 parts by weight of JSAF carbon black,
5.00 parts by weight of zinc oxide,
5.00 parts by weight of mineral oil plasticizer
1.00 part by weight of wool fat
1.50 parts by weight of stearic acid
0.75 part by weight of paraffin wax
2.00 parts by weight of sulphur
0.50 part by weight of phenyl cyclohexyl-p-phenylene diamine
0.50 part by weight of phenyl-β-naphthylamine This test mixture is divided into 7 equal parts. 1.8% by weight based on the rubber content of the mixture, of the following compounds is mixed with one part of the said test mixture.

(E) Phenyl diethyl sulphenamide
(F) 4-chlorophenyl diethyl sulphenamide
(G) 2,4,5-trichlorophenyl diethyl sulphenamide
(H) Pentachlorophenyl diethyl sulphenamide After vulcanization, the Schopper ring test provides the following values (the first number indicates the modulus value at 300% elongation and the second number the tensile strength (kg./cm.²) elongation (percent)):

| | E | F | G | H |
|---|---|---|---|---|
| 3.0 at— | | | | |
| 30' | 6–15 | 6–10 | 6–10 | 10–35 |
| 90' | 46–205/705 | 49–210/705 | 58–195/630 | 62–210/635 |
| 120' | 58–210/650 | 62–215/630 | 70–200/560 | 74–215/570 |
| 150' | 64–220/645 | 65–220/620 | 77–205/545 | 81–215/540 |

3 further parts of the above test mixture are mixed with 1.8% by weight based on the copolymerizate of the following compounds:

(I) 4-chlorophenyl cyclohexylethyl sulphenamide
(K) 2,3,5-trichlorophenyl cyclohexylethyl sulphenamide
(L) Pentachlorophenyl cyclohexylethyl sulphenamide After vulcanization, the Schopper ring test provides the following values (the first number indicates the modulus value at 300% elongation and the second number the tensile strength (kg./cm.²) elongation (percent)):

| | I | K | L |
|---|---|---|---|
| 3.0 at— | | | |
| 30' | 5–5 | 5–5 | 10–40 |
| 90' | 40–190/730 | 49–205/675 | 57–210/655 |
| 120' | 59–210/650 | 65–220/620 | 73–215/575 |
| 150' | 68–220/640 | 77–215/575 | 83–225/560 |

Example 8

A test mixture is prepared which contains the following per 100.00 parts by weight of butadiene Acrylonitrile copolymerizate:

44.00 parts by weight of HAF carbon black
5.00 parts by weight of zinc oxide 5.00 parts by weight of methylene-bis-thioglycolic acid butylester
1.50 parts by weight of stearic acid
0.75 part by weight of paraffin wax
2.00 parts by weight of sulphur
0.50 part by weight of phenyl cyclohexyl-p-phenylene diamine
0.50 part by weight of phenyl-β-naphthylamine This test mixture is divided into 14 equal parts. 1.8 percent by weight based on the rubber content of the mixture, of the following compounds is mixed with one part of the said test mixture.

(H) 4-chlorophenyl cyclohexylethyl sulphenamide
(I) 2,3,5-trichlorophenyl cyclohexylethyl sulphenamide
(K) Pentachlorophenyl cyclohexylethyl sulphenamide
(L) Pentachlorophenyl diethyl sulphenamide
(M) Pentachlorophenyl pyrrolidine sulphenamide
(N) Pentachlorophenyl-t-butylsulphenamide
(O) Pentachlorophenyl allylsulphenamide
(P) Pentachlorophenyl cyclohexylsulphenamide
(Q) Pentachlorophenyl dimethylsulphenamide
(R) Pentachlorophenyl dicyclohexyl sulphenamide
(S) Pentachlorophenyl piperidylsulphenamide
(T) Pentachlorophenyl hexamethylenimine sulphenamide
(U) Pentachlorophenyl morpholylsulphenamide
(V) Benzothiazyle-2-diisopropylsulphenamide After vulcanization, the Schopper ring test provides the following values (the first number indicates the modulus value at 300% elongation and the second number the tensile strength (kg./cm.$^2$) elongation (percent)):

|  | H | I | K |
|---|---|---|---|
| 1,5 at 30′ | 8- 10 | 6- 10 | 12- 45 |
| 3.0 at— |  |  |  |
| 30′ | 24-170 | 20-155 | 33-210/550 |
| 90′ | 47-230/500 | 55-235/470 | 68-225/415 |
| 120′ | 55-240/465 | 63-235/425 | 73-230/380 |

|  | L | M | O |
|---|---|---|---|
| 1,5 at 30′ | 15-100 | 14- 85 | 8- 20 |
| 3.0 at— |  |  |  |
| 30′ | 28-200/570 | 23-180 | 33-175/575 |
| 90′ | 68-235/385 | 62-240/420 | 64-225/445 |
| 120′ | 72-235/360 | 74-235/375 | 69-230/415 |

|  | N | P | Q |
|---|---|---|---|
| 1.5 at 30′ | 5- 15 | 8- 20 | 12- 60 |
| 3.0 at— |  |  |  |
| 30′ | 35-185/560 | 33-180/600 | 42-210/560 |
| 90′ | 71-230/415 | 67-230/445 | 75-230/440 |
| 120′ | 80-225/385 | 75-230/420 | 85-235/400 |

|  | R | S | T |
|---|---|---|---|
| 1.5 at 30′ | 8- 15 | 13- 60 | 11- 50 |
| 3.0 at— |  |  |  |
| 30′ | 42-215/530 | 38-210/570 | 40-200/570 |
| 90′ | 82-230/375 | 79-235/410 | 73-225/410 |
| 120′ | 92-225/355 | 84-240/395 | 81-235/390 |

|  | U | V |
|---|---|---|
| 1.5 at 30′ |  |  |
| 3.0 at— |  |  |
| 30′ | 6-15 | 55-235/460 |
| 90′ | 31-175/600 | 63-235/430 |
| 120′ | 67-225/430 | 78-240/360 |
|  | 75-230/410 | 81-230/330 |

*Example 9*

A test mixture is prepared which contains the following, per 100.00 parts by weight of chlorobutadiene polymer (type "Neopren" GRT):

30.00 parts by weight of MAF carbon black
3.00 parts by weight of mineral oil plasticizer
3.00 parts by weight of stearic acid
3.50 parts by weight of magnesia usta
5.00 parts by weight of zinc oxide
0.50 part by weight of antioxidant
0.50 part by weight of phenyl-a-naphthylamine This test mixture is divided into 6 equal parts. One of each parts is mixed with one of the following compounds in the amounts mentioned below which are based on the polymer.

(A) 1.25% pentachlorophenyl cyclohexylethyl sulphenamide
(B) 1.25% pentachlorophenyl ethylaniline sulphenamide
(C) 1.25% pentachlorophenyl dimethyl sulphenamide
(D) 1.25% pentachlorophenyl dicyclohexyl sulphenamide
(E) 1.25% pentachlorophenyl piperidine sulphenamide
(F) 0.90% mercaptobenzothiazyle disulfide After vulcanization, the Schopper ring test provides the following values (the first number indicates the modulus value at 300% elongation and the second number the tensile strength (kg./cm.$^2$) elongation (percent)):

|  | A | B | C |
|---|---|---|---|
| 0.5 at 40′ | 15- 50 |  | 17- 60 |
| 1.0 at— |  |  |  |
| 25′ | 20- 65 | 28- 90 | 20- 65 |
| 35′ | 30- 95 | 40-125 | 32- 95 |
| 2.5 at— |  |  |  |
| 40′ | 78-170/590 | 75-170/600 | 78-175/600 |
| 60′ | 84-175/560 | 78-175/575 | 85-175/560 |
| 90′ | 91-175/525 | 81-180/540 | 92-180/520 |

|  | D | E | F |
|---|---|---|---|
| 0.5 at 40′ |  | 14- 45 | 25- 80 |
| 1.0 at— |  |  |  |
| 25′ | 25- 85 | 16- 50 | 31- 90 |
| 35′ | 35-115 | 25- 80 | 51-135 |
| 2.5 at— |  |  |  |
| 40′ | 80-180/590 | 76-170/620 | 71-170/655 |
| 60′ | 83-180/540 | 83-175/550 | 80-175/580 |
| 90′ | 85-180/510 | 89-180/530 | 86-175/550 |

*Example 10*

A test mixture is prepared which contains the following per 100.00 parts by weight of isobutylene isoprene copolymerizate:

40.00 parts by weight of carbon black CK3
5.00 parts by weight of zinc oxide
2.50 parts by weight of stearic acid
2.00 parts by weight of sulphur
0.80 part by weight of tetramethylene thiuramide sulphide This test mixture is divided into 4 equal parts. To each part 0.8% which are based on the polymer of the following compounds are added:

(A) 2,3,5-trichlorophenyl piperidine sulphenamide
(B) Pentachlorophenyl piperidine sulphenamide
(C) 2,3,5-trichlorophenyl diethylene sulphenamide
(D) Pentachlorophenyl diethylene sulphenamide After suitable vulcanization, the Schopper ring test provides the following values (the first number indicates the modulus value at 500% elongation and the second number the tensile strength (kg./cm.$^2$) elongation (percent)):

|  | A | B | C | D |
|---|---|---|---|---|
| 1.0 at 40′ |  |  | 4- 5 | 4- 5 |
| 2.0 at 40′ | 13- 80 | 16- 95 | 12- 75 | 16- 95 |
| 4.0 at— |  |  |  |  |
| 30′ | 40-145/925 | 51-155/840 | 42-140/935 | 54-150/840 |
| 60′ | 62-150/810 | 72-160/775 | 61-155/775 | 68-160/730 |

We claim:
1. Compounds of the formula

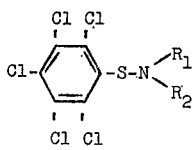

wherein $R_1$ and $R_2$ represents radicals selected from the group consisting of hydrogen, saturated hydrocarbon, and unsaturated hydrocarbon radicals, the sum of $R_1$ and $R_2$ being at most 12 carbon atoms, and radicals which, together with the nitrogen atom through a carbon to nitrogen bond forms a heterocyclic ring of the formula:

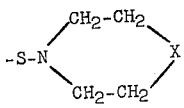

wherein X is selected from the group consisting of oxygen and sulfur.

2. The compounds of claim 1 wherein the saturated hydrocarbon radical is cycloalkyl.
3. The compounds of claim 1 wherein the unsaturated hydrocarbon radical is alkylaryl.
4. The compounds of claim 1 wherein the unsaturated hydrocarbon is an aryl radical.
5. Pentachlorophenyl cyclohexylsulfenamide.
6. Pentachlorophenyl dimethylsulfenamide.
7. Pentachlorophenyl morpholylsulfenamide.
8. Pentachlorophenyl piperidylsulfenamide.
9. In a process of sulfur-vulcanizing a member selected from the group consisting of natural rubber and synthetic rubber-like elastomers, the improvement which comprises using as a vulcanization accelerator 0.05–10% by weight of a sulfenamide of the formula of claim 1.
10. Process of claim 9 wherein said vulcanization accelerator is pentachlorophenyl cyclohexyl sulfenamide.
11. Process of claim 9 wherein said vulcanization accelerator is pentachlorophenyl piperidyl sulfenamide.
12. A rubbery material containing as a vulcanization accelerator 0.05–10% by weight of a sulfenamide of the formula:

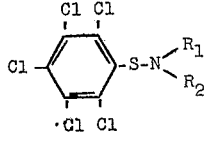

wherein $R_1$ and $R_2$ represents radicals selected from the group consisting of hydrogen, saturated hydrocarbon, and unsaturated hydrocarbon radicals, the sum of $R_1$ and $R_2$ being at most 12 carbon atoms, and radicals which, together with the nitrogen atom through a carbon to nitrogen bond forms a heterocyclic ring of the formula:

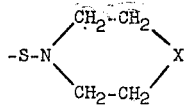

wherein X is selected from the group consisting of oxygen and sulfur; said rubbery material being a member selected from the group consisting of homopolymers of conjugated diolefins, copolymers of conjugated diolefins with polymerizable monovinyl monomers, copolymers of conjugated diolefins with isoolefins, polychlorobutadiene, and copolymers of chlorobutadiene with a copolymerizable vinyl monomer.

13. Composition of claim 12 wherein said vulcanization accelerator is pentachlorophenyl isopropyl sulfenamide.
14. Composition of claim 12 wherein said vulcanization accelerator is pentachlorophenyl diisopropyl sulfenamide.
15. Composition of claim 12 wherein said vulcanization accelerator is pentachlorophenyl morpholyl sulfenamide.
16. Composition of claim 12 wherein the rubbery material is a homopolymer of a conjugated diolefin.

References Cited in the file of this patent

UNITED STATES PATENTS

| Re. 19,286 | Zaucker et al. | Aug. 21, 1934 |
| 2,460,393 | Paul | Feb. 1, 1949 |
| 2,474,237 | Eby | June 28, 1949 |
| 2,554,097 | Edmonds | May 22, 1951 |
| 2,700,659 | Carr | Jan. 25, 1955 |
| 2,868,633 | Goodhue | Jan. 13, 1959 |

FOREIGN PATENTS

| 596,056 | Great Britain | Dec. 24, 1947 |